Figure 1:
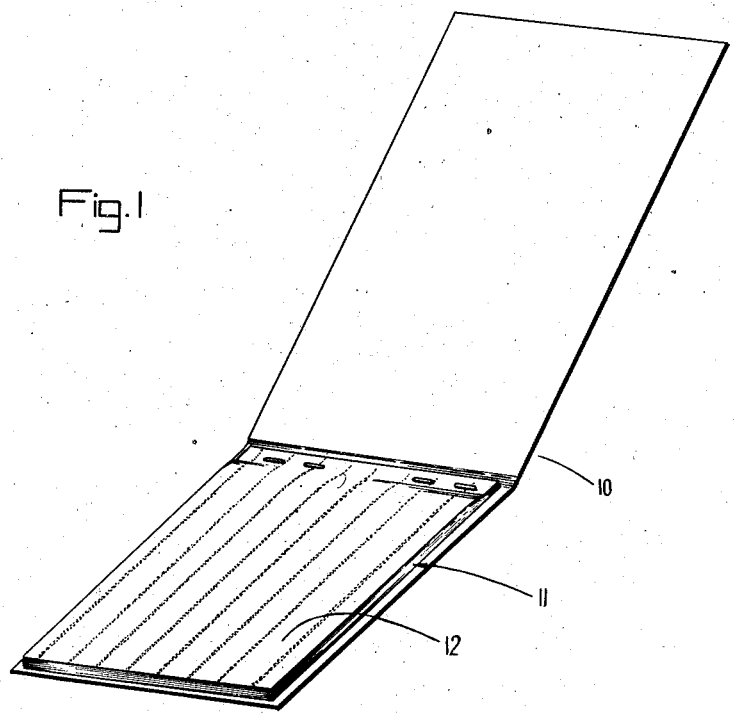

July 7, 1942.    L. L. JONES    2,288,714
CLEANING AND ANTIMIST FILM APPLYING ARTICLE
Filed Sept. 16, 1940

INVENTOR
LESTER L. JONES
BY
ATTORNEYS

Patented July 7, 1942

2,288,714

UNITED STATES PATENT OFFICE 2,288,714

CLEANING AND ANTIMIST FILM APPLYING ARTICLE

Lester L. Jones, Oradell, N. J.

Application September 16, 1940, Serial No. 356,983

4 Claims. (Cl. 15—209).

This invention relates to an article for cleaning glass surfaces or the like and simultaneously applying an anti-mist film thereto. The invention relates more particularly to such an article serviceable for cleaning polished surfaces to a highly transparent or perfectly reflective condition, and at the same time to make such surfaces highly resistant to the formation of misting films which tend to mar their polished transparency or reflectivity.

The present invention relates more particularly to improvements in an article of this character, described and claimed in my copending application Serial No. 293,959, filed September 8, 1939.

Cleaning and anti-mist treatment of polished surfaces has been hitherto accomplished by first applying a smear of anti-filming or anti-misting compound upon the surface, sometimes by spraying and other times by rubbing, and then wiping the smear clean with fresh rags or other absorbent materials. This is time wasting and inconvenient, in that it involves two separate operations, and also because it requires a plurality of cleaning elements. In view of this inconvenience, in most cases, people wait until vision has become dangerously obscured before wiping the glass clean.

In accordance with my present invention, the cleaning and anti-misting treatment can be reduced to a single operation by the use of a single carrier suitably processed so that it functions simultaneously for cleaning and applying the anti-mist film to the polished surface. Polished surfaces which are effectively treated by the use of the material of the present invention are eyeglass lenses, bathroom mirrors, automobile windows and windshields, refrigerated show cases, and the like, and in fact, any polished surface of a transparent or reflective nature the function of which is directly impaired by lack of cleanliness and by misting films formed thereon.

I have found that a flexible carrier such as a soft tissue paper or cloth may be combined with an anti-mist material in such a way that the cleaning operation and the anti-mist film applying operation may be accomplished at one and the same time and in a very simple and facile manner. This is done by combining the flexible carrier with the anti-mist material so that the anti-mist material is held on the carrier in such a way as to allow transfer of the said material to the polished surface such as glass and the like, to produce a thin, anti-mist film thereon at the same time and while the glass surface is cleaned by the carrier. I have also found that it is essential to apply the anti-mist material to the carrier in a predetermined quantity large enough in amount to leave on the cleaned surface a thin, anti-mist film, yet insufficient in amount to interfere in the first place with the cleaning effect of the carrier, or in the second place, to leave upon the cleansed surface any visible smear.

When the flexible carrier is thus suitably processed and contains the workable amount of anti-mist material, the carrier may be used as an ordinary piece of cleansing tissue or cloth is used and will function for simultaneously cleansing the polished surface and applying thereto a thin, invisible anti-mist film.

Figure 2:
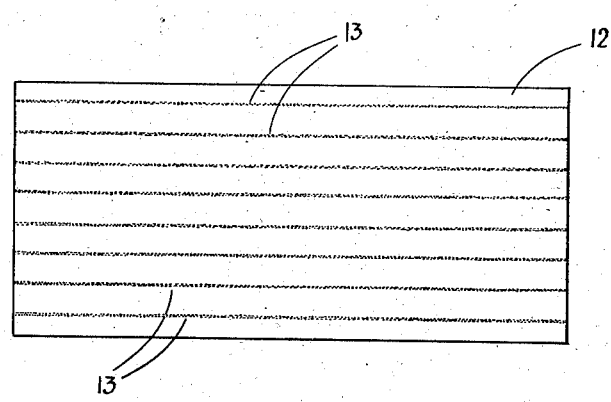

In the drawing, Fig. 1 is a perspective view of a book or packet containing a supply of the cleaning and anti-mist film applying article of the present invention; and Fig. 2 is a view of one sheet of said supply showing the flexible carrier and the applied anti-mist material.

The flexible carrier which is preferably employed is a porous material such as a soft tissue paper or cloth, which is adapted for use in wiping and cleaning polished surfaces such as glass or the like. The carrier should be free from any abrasive material which would scratch or mar the polished surface, and should also be free of any detachable particles which would tend to deposit themselves and remain on the polished surface after a wiping or cleansing operation. The carrier should preferably be fine textured, soft and porous in order to pick up foreign matter and absorb any moisture and grease which may be on the surface to be wiped, and also so that it may properly receive and have deposited thereon the anti-mist chemical with which it is treated to produce the product of the present invention.

This soft tissue paper or cloth flexible carrier is treated with the anti-mist material. According to a preferred form of the invention, the anti-mist material is applied to only one face of the carrier, leaving the other face free to be engaged by and pressed between the user's fingers without the fingers becoming soiled by the anti-mist material. Any of a number of well known anti-mist chemicals may be used; these comprise water-soluble and foaming materials, such as elm-bark, acacia, ordinary soap, and generally most stearates, oleates, palmitates, etc. I have found such materials as a sodium salt of a sulphonated fatty ester known as "Artic Syntex M" manufactured by the Colgate-Palmolive-Peet Company, and a penetrating agent known as "Wetanol" marketed by the Glyco Products Co. of New York, to be serviceable. The chemical is applied in a highly concentrated solution form to the flexible carrier and in such a way that it does not penetrate or become absorbed by the fibres of the carrier. The desired results can only be obtained by the use of an extremely minute and generally critical amount of the anti-mist material. Thus, if too much is employed, there results on the polished surface a visible film or smear that continued rubbing will not satisfactorily remove. Furthermore, the use of too much of the anti-mist material has a tendency to interfere with the cleansing function of the flexible carrier. On the other hand, if an insufficient amount of the anti-mist material is used on the carrier although the polished surface may be wiped clean, no anti-misting film will be formed; the anti-mist material is, therefore, deposited on the carrier in a predetermined quantity large enough in amount to leave on the clean surface the thin anti-mist film desired. While the amount of anti-mist chemical applied is generally critical, it is dependent upon a number of factors, prime among which are the nature of the carrier, the character of the anti-mist material used, and the method of applying the material to the carrier.

In the product disclosed in my aforesaid copending application Serial No. 293,959, methods of applying the anti-mist material to the carrier are used which result in the uniform coating and distribution of a critical small amount of the material over the surface of the carrier. I have found that an improved product and better operative results may be obtained by applying the anti-mist material in greater or more concentrated amounts in spaced or separated areas on the carrier, the result being that the material is mass distributed in spaced portions or areas on the carrier. When the material is uniformly coated over the carrier as described in my said co-pending application, it is found difficult in production to maintain the required accuracy of deposit, so that slight variations in the carrier itself, in the drying time or in the air humidity during application, yield either too much or too little of the anti-mist material. Also, with such a coating, the layer of the material has to be applied very thin and a thin layer is unduly sensitive to changes by surface oxidation or other reactions over the period of time, possibly six months, between manufacture and use. Furthermore, thin films require considerable rubbing for transfer to the polished surface, and while thicker coatings on the carrier permit the transfer thereof to the polished surface and the production thereon of an anti-mist film with greater ease and less rubbing, the thicker films cannot be used because the excess amount of the anti-mist material produces smearing, which, even continued rubbing does not remove, but on the contrary, aggravates the condition. I have discovered that the mass distribution of the anti-mist material in spaced areas on the carrier effectively solves all of these difficulties.

More specifically, I have found that when the anti-mist material is applied or deposited on the flexible carrier in small areas or regions with a high concentration, and particularly when the spaces between these areas are substantially free of the anti-mist material, the following improved results are obtained both in manufacture and use of the product. The production is less critical and may be speeded up and a resulting product is produced which is not as subject to time change. The greater density of the anti-mist material in the applied areas renders more facile the transfer of the material to the glass or other surface on the first rub. The initial smear produced (due to the localized excess) is wiped off or removed from the glass by the parts of the carrier which are untreated or free of the anti-mist material. In the preferred form, a substantial part of the carrier is left free of the chemical and there results that any grease, dirt or oil on the glass or other surface is more easily and completely absorbed by the untreated part of the carrier; so that the cleaning and polishing function of the product is the better effected. In this new mass distribution in spaced areas, the thickness of the material is relatively so great at the said areas that surface changes over long periods of time produce a negligible effect.

I have found that to accomplish the best results, the general conditions that should be specified are the following:

(1) The areas treated with the anti-mist material should be a small percentage of the total area of the carrier. The treated areas may be, for example, 10% of the total area. This enables the use of a density or thickness of the anti-mist material in the treated areas to be substantially ten times as great as compared to the case where the material is applied in a uniform coating.

(2) The treated areas should be close together and uniformly distributed over the carrier area. The criterion of closeness is that the applied use pressure area should span one or more treated areas. Thus, if the article is to be employed for the cleaning of eyeglass lenses, the treated area should be spaced close enough to permit the fingers to span one or more treated areas, no matter where the fingers are placed. If the article is to be used in larger sheets as windshield wipers, these areas should be similarly related to the pressure area of the hand. For eyeglass cleaning tissues, a preferred arrangement is to cover the surface of the carrier with a uniform series of stripes or parallel lines, each about .025 inch wide and regularly spaced about .25 inch apart. Instead of a striped arrangement, a spotted arrangement may be used.

(3) The total area and chemical (anti-mist material) relation is a quantitatively critical relation, as above set forth, and as further detailed in my copending application.

The anti-mist material may be applied to the carrier in any suitable way. It is preferably applied in liquid form in the most concentrated solution practicable, even to the extent of maintaining it hot to keep from precipitation or jelling. Preferably, the product should be dried immediately after application of the chemical and at a very rapid rate, so as to minimize penetration of the anti-mist material into the fibres of the carrier. The resulting product is a relatively dry carrier containing a relatively dry anti-mist material, and the product is to be used in the dry state.

In making books or packets using a paper tissue carrier, the chemical is applied to a continuously moving sheet of the paper tissue, after which the same is suitably cut and stacked in book and packet form. In such a tissue carrier, I have found it desirable to obtain at least a tenfold increase or massing of chemical thickness by applying the material in stripes or lines about .025 inch wide and spaced apart about ¼ inch. With finer lines or stripes, closer spacing may be used or greater thickness of chemicals may be obtained with the same spacing.

Referring now to the drawing, I show in Fig. 1 thereof a book or packet containing a number of paper tissue carriers, and in Fig. 2 one of the paper tissue carriers of said packet. The book or packet 10 contains a stack or supply 11 of paper tissue carriers 12. Each tissue carrier 12 is supplied with the anti-mist material, the anti-mist material being applied in the fine lines or stripes 13, 13. As shown in the drawing, these stripes or lines of the anti-mist material or chemical may be very narrow as compared with the free spaces therebetween; and as an example of the same the stripes or lines may, as aforesaid, be about .025 inch wide and spaced apart about ¼ inch.

By means of the improvement of the present invention, therefore, the anti-mist material is mass distributed in spaced areas on the carrier, that is to say, is distributed in relatively narrow and deep amounts in spaced areas on the carrier. Preferably, as stated, the spaces between the areas are substantially free of the anti-mist material, and these spaces are preferably greater than a lateral dimension of the applied areas. While I prefer to concentratedly deposit the anti-mist material in narrow spaced stripes on the carrier, it will be apparent that other formations such as spot application may be used.

In addition to the more generic improved results accomplished as afore-described, I have found that other advantages are also obtained. Thus, oil or skin grease removal from glass to remove all traces of film or smear is most difficult to obtain with most flexible carriers, but may be obtained with the use of a type of very thin (one mil or less) rag base tissue similar in appearance to those used for cigarettes and carbon papers. However, this type of tissue possesses no wet strength, so that it cannot be treated if coated all over with the chemical. I have found, however, that when small parts or areas of the surface are wetted pursuant to the method of the present invention, the tissue does not suffer any reduction in strength and the application of the anti-mist material to the carrier may be made with simple machinery at high speeds.

The tissue paper which I have found most effective for this use is a 100% rag paper, the paper being made of a mixture of hemp and flax. The thinness of the all-rag base tissue paper is such that a ream of 20 x 30 inches of the same weighs 5½ pounds.

The exact application of the necessary critical amount of the chemical to any of the carriers used is also facilitated by the new spotted or striped distribution of the present invention. This arises because a liquid application may be made to give a mainly surface layer even on very thin and absorbent carriers.

The cleaning and anti-mist film applying article of the present invention may be prepared in the form of different packages and of appropriate sizes. For a vest pocket size and for personal use, the processed tissue carriers may be put up in stacked looseleaf form or in book form. Such a package may be readily carried in the consumer's pocket and the tissues may be individually stripped from the package as required for use. For household and automobile use, larger packages may be made with the individual tissues or fabric carriers stacked or interleaved.

The method of making and using the cleaning and anti-mist film applying articles of the present improved invention and the many advantages thereof will be fully apparent from the above-detailed description. It will be further apparent that while I have described the preferred product of the invention, modifications may be made therein without departing from the spirit or essence of the invention defined in the following claims.

I claim:

1. An article for simultaneously dry cleaning glass surfaces or the like and applying thereto an anti-mist film comprising, a relatively dry flexible carrier effective for dry cleaning and polishing the glass surface, and a relatively dry minute quantity of anti-mist material on said carrier, said anti-mist material being deposited on said carrier in said minute quantity in an amount insufficient to interfere with the dry cleaning effect of the carrier but sufficient to allow transfer of said material to the glass surface when dry cleaned by said carrier to simultaneously produce thereon a thin anti-mist film, the said anti-mist material being distributed in spaced areas on said carrier, the spaces between said areas being substantially free of the anti-mist material.

2. The article as claimed in claim 1, in which the said areas are uniformly distributed and closely spaced on said carrier, with the spaces therebetween greater than a lateral dimension of said areas.

3. An article for simultaneously dry cleaning glass surfaces or the like and applying thereto an anti-mist film comprising, a relatively dry flexible carrier effective for dry cleaning and polishing the glass surface, and a relatively dry minute quantity of anti-mist material on said carrier, said anti-mist material being deposited on said carrier in said minute quantity in an amount insufficient to interfere with the dry cleaning effect of the carrier but sufficient to allow transfer of said material to the glass surface when dry cleaned by said carrier to simultaneously produce thereon a thin anti-mist film, the said anti-mist material being deposited in narrow spaced stripes on said carrier, the spaces between said stripes being substantially free of anti-mist material.

4. An article for simultaneously dry cleaning glass surfaces or the like and applying thereto an anti-mist film comprising, a tissue paper carrier effective for dry cleaning and polishing the glass surface, and a relatively dry minute quantity of anti-mist material on said carrier, said anti-mist material being deposited on said carrier in said minute quantity in an amount insufficient to interfere with the cleaning effect of the carrier but sufficient to allow transfer of said material to the glass surface when dry cleaned by said carrier to simultaneously produce thereon a thin anti-mist film, the said anti-mist material being distributed in spaced stripes on said carrier, the said stripes being of the order of .025 inch wide spaced about .25 inch apart.

LESTER L. JONES.